No. 624,710. Patented May 9, 1899.
W. E. VERNON.
PUMP ROD OPERATING DEVICE FOR WINDMILLS.
(Application filed Apr. 13, 1898.)
(No Model.)
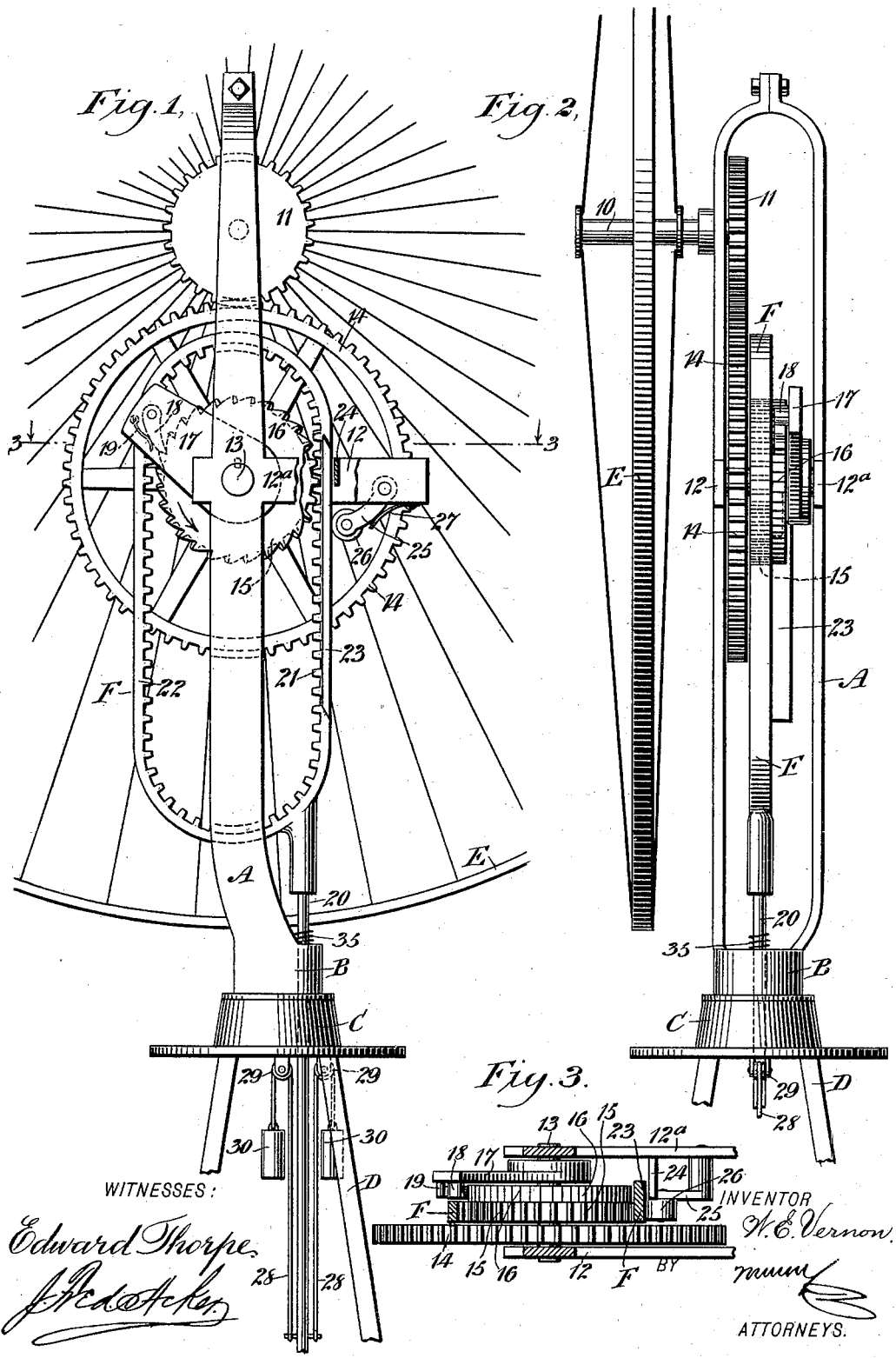

UNITED STATES PATENT OFFICE.

WILLIAM E. VERNON, OF SAN ANGELO, TEXAS.

PUMP-ROD-OPERATING DEVICE FOR WINDMILLS.

SPECIFICATION forming part of Letters Patent No. 624,710, dated May 9, 1899.

Application filed April 13, 1898. Serial No. 677,416. (No model.)

*To all whom it may concern:*

Be it known that I, WILLIAM E. VERNON, of San Angelo, in the county of Tom Green and State of Texas, have invented a new and useful Improvement in Pump-Rod-Operating Devices for Windmills, of which the following is a full, clear, and exact description.

The object of the invention is to so construct the windmill that a quick downstroke of the plunger will be obtained, which will increase the capacity of the mill over others of the usual construction, and whereby any desired length of cylinder may be used and the lifting will be performed in a straight line with the pipe and plunger-shaft.

A further object of the invention is to provide a better-balanced standard than usual and to provide a bearing for the gearing at each side of the standard.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is an elevation of the upper portion of a windmill, a portion of the arms of the standard being broken away. Fig. 2 is an edge view of the standard and the wind-wheel, and Fig. 3 is a horizontal section taken practically on the line 3 3 of Fig. 1.

A represents a loop-standard; B, a turn-table attached to the said standard; C, the upper portion of a tower D, upon which the turn-table is mounted to revolve, and E represents a wind-wheel of any approved construction. This wind-wheel is attached to a shaft 10, journaled in what may be termed the "front vertical member" of the loop-standard A, near the top portion of the standard, and within the standard A a drive-gear 11 is secured to the shaft 10. At or near the center of the standard, at the right-hand side viewed from the rear, two horizontal parallel branch arms 12 and 12$^a$ are formed, and about on a line with the said branch arms a shaft 13 is journaled in the two main members of the loop-standard, as shown in Fig. 3. A gear 14 is secured on the shaft 13 and meshes with the driving-gear 11, as shown in Figs. 1 and 2. A pinion 15, provided with an attached ratchet-wheel 16, is loosely mounted on the shaft 13, and an arm 17 is attached to the shaft near its rear end, the said arm being provided with a dog 18, controlled by a spring 19, the dog being adapted to engage with the teeth of the ratchet-wheel 16 and turn the same in the direction of the arrow shown in Fig. 1. The pinion 15 is placed within a vertically-disposed oblong plunger-head F, to the lower end of which the plunger-shaft 20 is attached. Teeth 21 are produced upon the inner face of the plunger-head at one side, while other teeth 22 are produced upon the inner face of the plunger-head at the opposing side. The end portions of the plunger-head are somewhat rounded, and the teeth are continued around the rounded surface. At the right-hand side of the oblong plunger-head, when the said head is viewed from the rear of the machine, a lateral projection 23 is formed, extending in direction of the rear branch arm 12$^a$ of the standard. The ends of the projection 23 from the plunger-head are beveled in opposite directions, as shown in Fig. 1. The projection 23 of the plunger-head is adapted in different positions of said plunger-head to be located at one or at the other side of a lug 24, extending from the inner face of the rear branch arm 12$^a$ of the standard, as is best shown in Fig. 3. Upon this same branch arm of the standard and likewise upon its inner face an arm 25 is pivoted, which arm carries a roller 26 at its free end, and the roller is adapted for engagement with the outer edge of the plunger-head at that side carrying the projection 23, a spring 27 serving to normally hold the arm 25 in such position. Cords or chains 28 are secured to the plunger-shaft below the platform C, one at each side, and these cords or chains are carried upward over pulleys 29, which may be attached to the platform C, as shown in Fig. 1, and weights 30, springs, or their equivalents are secured to the lower ends of the said cords or chains.

In the operation of the windmill the shaft 13 is revolved by a gear connection with the wind-wheel shaft. As the shaft revolves in the direction indicated by the arrow shown in Fig. 1 the dog 18 of the arm 17, attached to the shaft, will cause the ratchet-wheel and its attached gear to travel in the same direction as the shaft. The upward stroke of the plunger-shaft is brought about by the pinion 15 engaging with the teeth 21 on the plunger-head, being held in such engagement by the spring-controlled arm 25 and by the rotation of the shaft 13. As this shaft revolves and carries with it the said pinion the plunger-head will be moved upward, and in the upward movement of the plunger-head the left-hand member of the said head, as viewed from the rear of the machine, will be between the lug 24 and the pinion 15, as shown in Fig. 1. Therefore when the teeth of the pinion 15 are about to engage with the teeth 21 at the lower circular portion of the plunger-head the lower end of the projection 23 will be just above the lug 24, and when the teeth of the pinion 15 fully engage with the lower circularly-arranged teeth 21 the plunger-head will be moved laterally to such an extent that the lug 24 may engage with the inner face of the projection 23. Consequently the plunger-head will be thrown over in direction of the lug 24, disengaging the teeth of the pinion from the teeth 21 and bringing the opposite teeth 22 in engagement with said pinion. The plunger-shaft and attached head being heavy will cause said plunger-head to drop much more quickly than it was raised, and, in fact, the plunger-head on its downward movement will travel faster than the movement of the gearing; but the downward movement of the plunger may be regulated as required by increasing or decreasing the resistance of the weights or springs 30 to the downward movement of the plunger and, further, by regulating the size of the valve in the lower end of the plunger.

The plunger-shaft 20 is preferably provided with a cushion 35, which may be a spring, as shown, or an elastic material, and which tends to prevent the shaft from rocking and adds to the rebound of the shaft.

It will be observed that the construction above set forth is exceedingly simple, durable, and economic and that in addition to the simplicity of its construction the power of the windmill for pumping purposes is greatly increased over similar mills.

Having thus described my invention, I claim as new and desire to secure by Letters Patent—

1. In a windmill, an oblong plunger-head provided with internal teeth forming a rack, a gearing operated by the windmill, a portion of which gearing is arranged for alternate engagement with the teeth at the sides of the plunger-head, being adapted to elevate the head and admit of a more rapid descent than ascent of the head, a plunger-shaft connected with the plunger-head, and a retarding device connected with the plunger-shaft and adapted to exert influence thereon on its downward movement, substantially as shown and described.

2. The combination, with a drive-shaft and a shaft driven therefrom, the said driven shaft being provided with an attached arm carrying a dog and a combined ratchet and gear wheel loosely mounted on the driven shaft, the said dog being adapted for engagement with the said ratchet-wheel, of an oblong skeleton plunger-head within which the loosely-mounted gear is located, the end portions of the plunger-head being rounded and its inner face provided with teeth, the width between the sides of the plunger-head being greater than the diameter of the gear within the head, and guide devices adapted to hold either series of side teeth of the head in mesh with the teeth of the said loosely-mounted gear, as and for the purpose set forth.

3. The combination, with a drive-shaft, a shaft driven therefrom, an arm secured to the said shaft, provided with a dog, and a combined ratchet and gear wheel loosely mounted on the shaft, the ratchet-wheel being engaged by the said dog, of an oblong skeleton plunger-head within which the loosely-mounted gear is located, the said oblong plunger-head being provided with internal teeth, the space between the sides of the plunger-head being greater than the diameter of the said gear, a projection from one side of the plunger-head, a lug adapted to engage with one or the other side of the said projection, and a spring-controlled arm arranged for engagement with the side of the plunger-head near which the said lug is located, for the purpose set forth.

4. In a windmill, a loop-standard, a wheel-shaft journaled in the said standard, a shaft driven from the wheel-shaft, having both ends supported by the said standard, gearing operated from the driven shaft, a plunger operated by the said gearing, the plunger comprising an oblong head having internal teeth at opposite sides, a rod connected with the said head, and a retarding device for the rod on its downward stroke, substantially as described.

WILLIAM E. VERNON.

Witnesses:
B. W. RIMES,
A. W. ARMSTRONG.